US008400519B2

(12) United States Patent
Choi

(10) Patent No.: US 8,400,519 B2
(45) Date of Patent: Mar. 19, 2013

(54) MOBILE TERMINAL AND METHOD OF CONTROLLING THE OPERATION OF THE MOBILE TERMINAL

(75) Inventor: Kyung Dong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 12/775,957

(22) Filed: May 7, 2010

(65) Prior Publication Data
US 2011/0128395 A1 Jun. 2, 2011

(30) Foreign Application Priority Data

Nov. 27, 2009 (KR) ........................ 10-2009-0116057

(51) Int. Cl.
H04N 5/228 (2006.01)
H04N 5/222 (2006.01)
G06K 9/32 (2006.01)
G06K 9/03 (2006.01)
G06K 9/68 (2006.01)
G06F 3/048 (2006.01)

(52) U.S. Cl. ........... 348/222.1; 348/333.11; 348/333.12; 348/333.02; 382/294; 382/309; 382/218; 715/790; 715/794; 345/629

(58) Field of Classification Search ............... 348/222.1, 348/129, 134, 161, 333.01–333.12; 455/456.1, 455/456.6; 382/218, 284, 294, 309, 310, 382/311; 345/629; 715/790, 794, 797, 798
See application file for complete search history.

(56) References Cited

U.S. PATENT DOCUMENTS

| 7,738,032 | B2 * | 6/2010 | Kollias et al. ................. 348/370 |
| 7,948,549 | B2 * | 5/2011 | Honjo et al. ............. 348/333.05 |
| 2001/0048815 | A1 * | 12/2001 | Nakajima et al. ............. 396/310 |
| 2005/0036044 | A1 * | 2/2005 | Funakura ....................... 348/239 |
| 2005/0057657 | A1 * | 3/2005 | Yamada et al. .......... 348/207.99 |
| 2007/0258010 | A1 * | 11/2007 | Hong et al. ................... 348/564 |
| 2007/0291154 | A1 * | 12/2007 | Moon et al. ............. 348/333.05 |
| 2008/0192125 | A1 * | 8/2008 | Kang et al. ................. 348/222.1 |

* cited by examiner

Primary Examiner — Lin Ye
Assistant Examiner — Marly Camargo
(74) Attorney, Agent, or Firm — Birch, Stewart, Kolasch & Birch, LLP

(57) ABSTRACT

A mobile terminal and a method of controlling the operation of the mobile terminal are provided. The method includes setting a first image as a reference image; if an image comparison mode is selected, operating a camera in a close-up photography mode; displaying a preview image currently being provided by the camera on a display module; and if the preview image is chosen to be captured, displaying a comparison result screen showing differences between the first image and a second image obtained by capturing the preview image on the display module. Therefore, it is possible for a user to easily identify the differences between the first and second images from the comparison result screen.

6 Claims, 9 Drawing Sheets

# MOBILE TERMINAL AND METHOD OF CONTROLLING THE OPERATION OF THE MOBILE TERMINAL

CROSS-REFERENCE TO RELATED APPLICATION

This application claims the priority benefit of Korean Patent Application No. 10-2009-0116057, filed on Nov. 27, 2009 in the Korean Intellectual Property Office, the disclosure of which is incorporated herein by reference.

BACKGROUND OF THE INVENTION

1. Field of the Invention

The present invention relates to a mobile terminal capable of comparing an image captured by a camera with a reference image and displaying the differences between the captured image and the reference image and a method of controlling the operation of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, double-sided liquid crystal displays (LCDs), full touch screens or high-resolution cameras have been employed in the manufacture of mobile terminals.

More and more research is underway to develop mobile terminals equipped with various well-being related or aesthetic features and thus to help users to monitor or manage their appearance or health using the mobile terminals. Therefore, it is necessary to compare an image captured by a mobile terminal with a reference image, display the differences between the captured image and the reference image and thus to help a user of the mobile terminal to easily identify changes in his or her appearance or health.

SUMMARY OF THE INVENTION

The present invention provides a mobile terminal capable of comparing an image captured by a camera with a reference image and displaying the differences between the captured image and the reference image and a method of controlling the operation of the mobile terminal.

According to an aspect of the present invention, there is provided a method of controlling the operation of a mobile terminal, the method including setting a first image as a reference image; if an image comparison mode is selected, operating a camera in a close-up photography mode; and displaying a preview image currently being provided by the camera on a display module.

According to another aspect of the present invention, there is provided a mobile terminal including a camera; a display module; and a controller configured to set a first image as a reference image, wherein, if an image comparison mode is selected, the controller operates the camera in a close-up photography mode and displays a preview image provided by the camera on the display module.

According to another aspect of the present invention, there is provided a method of controlling the operation of a mobile terminal, the method including setting a first image as a reference image; if an image comparison mode is selected, operating a camera in a close-up photography mode; and displaying a comparison result screen showing differences between the first image and a preview image currently being provided by the camera on the display module.

According to another aspect of the present invention, there is provided a mobile terminal including a camera; a display module configured to display a preview image currently being provided by the camera; and a controller configured to set a first image as a reference image, wherein, if an image comparison mode is selected, the controller operates the camera in a close-up photography mode and displays a comparison result screen showing differences between the first image and the preview image on the display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
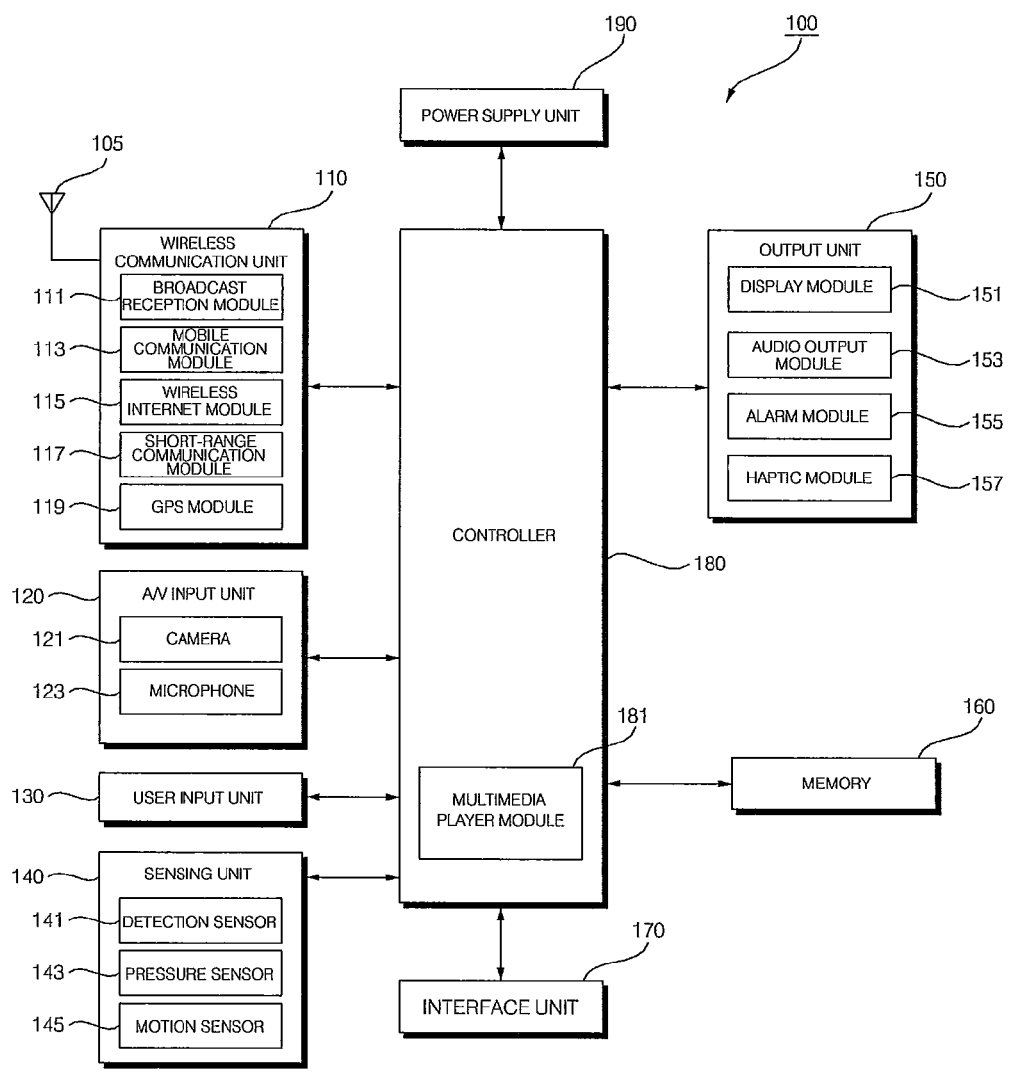
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

Figure 2:
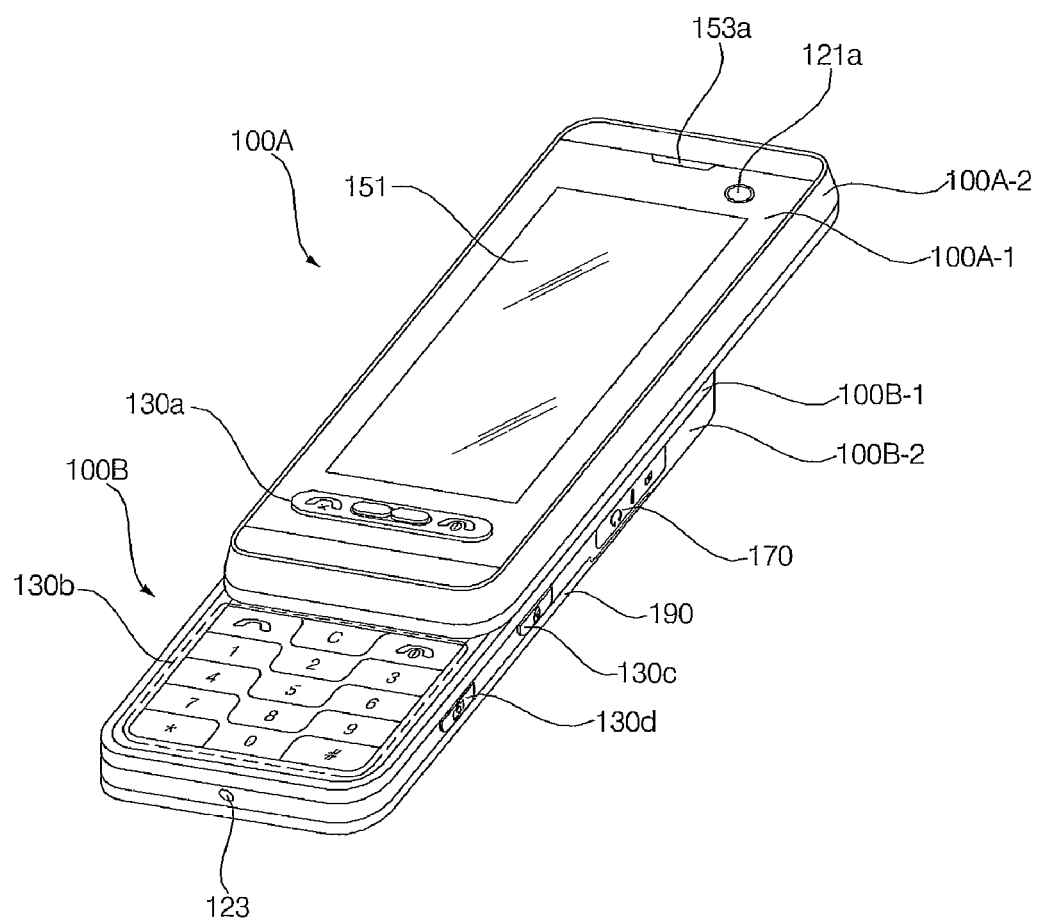
FIG. 2 illustrates a front perspective view of the mobile terminal shown in FIG. 1.
Figure 3:
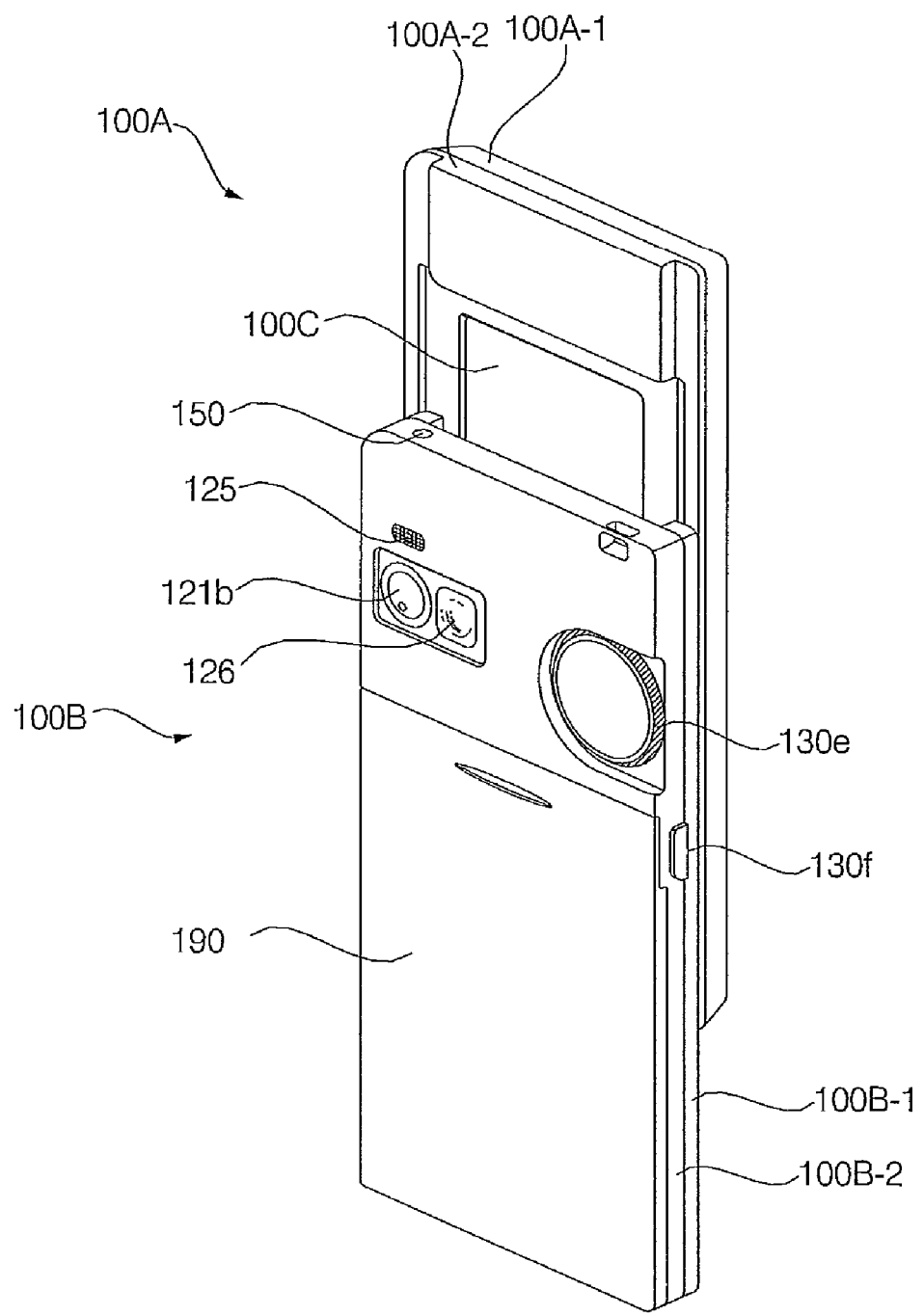
FIG. 3 illustrates a rear perspective view of the mobile terminal shown in FIG. 2.

FIG. 2 illustrates a front perspective view of the mobile terminal 100 shown in FIG. 1, and FIG. 3 illustrates a rear perspective view of the mobile terminal 100 shown in FIG. 2.

The exterior of the mobile terminal 100 will hereinafter be described in detail with reference to FIGS. 2 and 3. For convenience, assume that the mobile terminal 100 is a bar-type mobile terminal equipped with a touch screen. However, the present invention is not restricted to a bar-type mobile terminal. Rather, the present invention can be applied to various mobile phones, other than a bar-type mobile terminal.

Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. The display module 151, a first audio output module 153a, a first camera 121a and a first user input module 130a may be disposed in the front case 100A-1.

If a touch pad is configured to overlap the display module 151 and thus to form a layer structure, the display module 151 may serve as a touch screen and may thus allow the user to input various information to the mobile terminal 100 simply by touching the display module 151.

The first audio output module 153a may be implemented as a receiver or a speaker. The first camera 121a may be configured to be suitable for capturing a still or moving image of the user.

The exterior of the second body 100B may be defined by a second front case 100B-1 and a second rear case 100B-2. A second user input module 130b may be disposed in the second body 100B, and particularly, at the front of the second front case 100B-1. Third and fourth user input modules 130c and 130d, the microphone 123 and the interface unit 170 may be disposed in the second front case 100B-1 or the second rear case 100B-2.

The first through fourth user input modules 130a through 130d and fifth and sixth user input modules 130e and 130f may be collectively referred to as the user input unit 130. The user input unit 130 may adopt various manipulation methods as long as it can offer tactile feedback to the user.

The first user input module 130a may allow the user to enter various commands (such as 'start', 'end', and 'scroll'), the second user input module 130b may allow the user to enter various numerals, characters or symbols to the mobile terminal 100, and the third and fourth user input modules 130c and 130d may be used as hot keys for activating certain functions.

The microphone 123 may be configured to properly receive the user's voice or other sounds.

Referring to FIG. 3, the fifth user input module 130e, which is of a wheel type, and the second camera 121b may be disposed at the rear of the second rear case 100B-2 of the second body 100B may be disposed on one side of the second body 100B, and the sixth user input module 130f may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A camera flash 125 and a mirror 126 may be disposed near the second camera 121b. The camera flash 125 may be used to illuminate a subject when the user attempts to capture an image of the subject with the second camera 121b. The mirror 126 may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

A second audio output module (not shown) may be additionally provided in the second rear case 100B-2. The second audio output module may realize a stereo function along with the first audio output module 153a. The second audio output module may also be used in a speaker-phone mode.

An antenna for receiving a broadcast signal may additionally be provided on one side of the second rear case 100B-2. The antenna may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The power supply unit 190 may be disposed in the second rear case 100B-2. The power supply unit may be a rechargeable battery and may be coupled to the second rear case 100B-2 so as to be attachable to or detachable from the second rear case 100B-2.

The second camera 121b, the antenna 105, and the camera flash 125, which have been described as being provided in the rear case 100A-2, may be provided in the front case 100A-1. In this case, when the mobile terminal 100 is closed, the second camera 121b, the antenna 105, and the camera flash 125 may be protected by the second body 100B.

A third camera (not shown) may be additionally provided in the second rear case 100B-2, and may serve as a dual camera together with the second camera 121b.

The first camera 121a may be configured to be rotatable and thus to cover the photographing direction of the second camera 121b. In this case, the second camera 121b may be optional.

Figure 4:
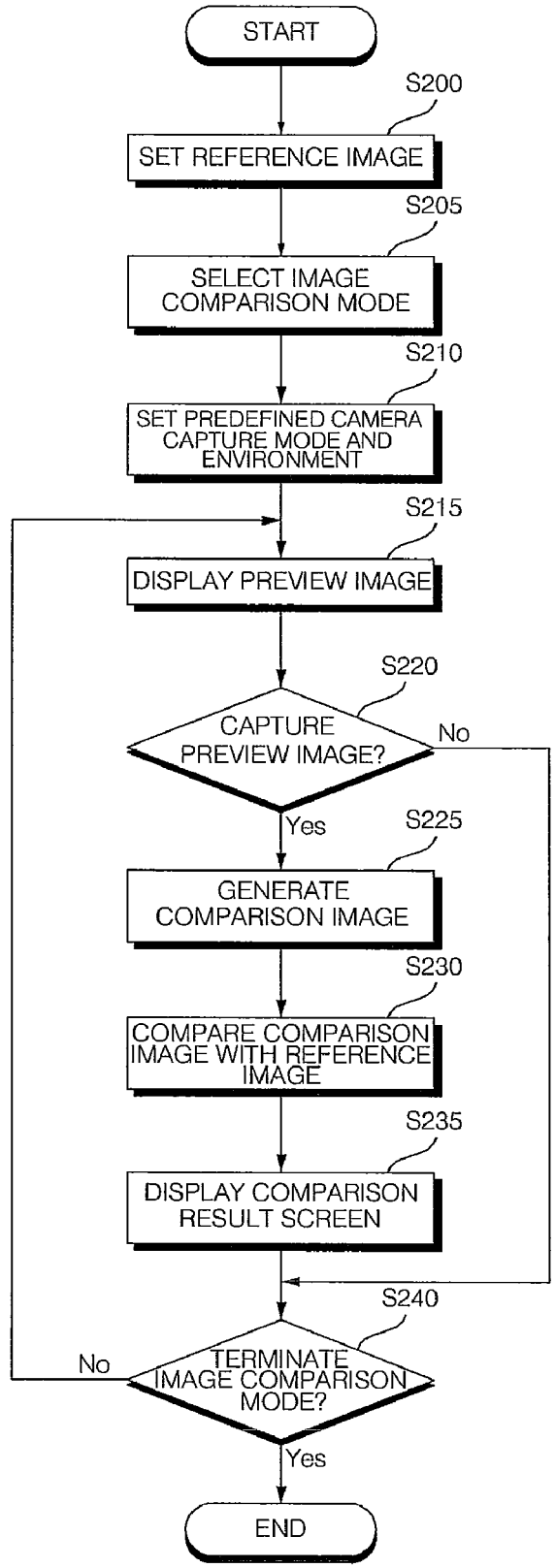
FIG. 4 illustrates a flowchart of a method of controlling the operation of a mobile terminal according to an exemplary embodiment of the present invention.

FIG. 4 illustrates a flowchart of a method of controlling the operation of a mobile terminal according to an exemplary embodiment of the present invention. Referring to FIG. 4, a reference image may be set (S200). The reference image may be stored in the memory 160. More specifically, the user may select one of a plurality of images captured by the camera module 121 as the reference image or may set any arbitrary image as the reference image. A menu for setting or changing the reference image may be provided.

Thereafter, if an image comparison mode for comparing the reference image and an image captured by the camera module 121 and displaying the results of the comparison is selected in response to, for example, a user command (S205), the controller 180 may control a predefined camera capture mode and environment to be set for the camera module 121 (S210). The image comparison mode may be selected by pressing a predefined key or touching a predefined icon on the display module 151. During the image comparison mode, the first camera 121a, which is generally used for capturing images, or the second camera 121b, which is generally used during a video call, may be used.

The predefined camera capture mode and environment set for the camera module 121 may allow an image to be captured with high precision by the camera module 121 and may thus facilitate the comparison of the captured image and the reference image in detail. The predefined camera capture mode and environment set for the camera module 121 may include a macro mode, an ultra high-resolution condition, a bright lighting condition and a self-capture mode allowing the user to capture an image of him- or herself.

The macro mode is for taking a close-up picture when the focal distance is 30 cm or less. Since the macro mode requires a different focusing method from a normal mode, the operation of the camera module 121 during the macro mode may need to differ from the operation of the camera module 121 during a normal mode. In addition, during the macro mode, the illumination of an object may need to be appropriately adjusted. The macro mode may allow a detailed, close-up image to be captured with high precision by the camera module 121 and may thus facilitate the comparison of the captured image and the reference image in detail.

The predefined camera capture mode and environment set for the camera module 121 may vary according to time (e.g., whether daytime or night-time) and location (e.g., whether indoor or outdoor).

Thereafter, the controller 180 may display a preview image of a subject created by the camera module 121 on the display module 151 (S215).

Thereafter, if the user chooses to capture the preview image (S220), the controller 180 may control the camera module 121 to capture the preview image and may thus generate a comparison image (S225).

Image correction such as perspective distortion correction, vignetting correction or chromatic aberration correction may be performed on the comparison image. More specifically, perspective distortion correction may be performed in order to correct the comparison image for, particularly, barrel distortion or pincushion distortion. Vignetting correction may be performed in order to correct the comparison image for vignetting, which is a reduction of an image's brightness or saturation at the periphery compared to the image center. Chromatic aberration correction may be performed in order to correct the comparison image for chromatic aberration, which is a type of distortion in which there is a failure to focus all colors to the same convergence point and occurs because lenses have a different refractive index for different wavelengths of light.

Once the comparison image is created, the controller 180 may compare the comparison image and the reference image by, for example, using motion vectors (S230).

Thereafter, the controller 180 may display a comparison result screen showing the results of the comparison performed in operation 5230 on the display module 151 (S235). The controller 180 may display the comparison result screen in various manners. For example, the controller 180 may divide the screen of the display module 151 into two screens, may display the reference image and the comparison image on the two screens, and may display the differences between the reference image and the comparison image in the comparison image. Alternatively, the controller 180 may combine the reference image and the comparison image into a single image by laying them over each other, and may display the differences between the reference image and the comparison image distinguishably in the single image. The comparison result image may be stored in the memory 160 upon the request of the user.

Operations S215 through S235 may be repeatedly performed until the user chooses to terminate the image comparison mode (S240). In this manner, it is possible to effectively compare the reference image and the comparison image and display the results of the comparison differences. Thus, it is possible for the user to easily identify the differences between the reference image and the comparison image.

The image comparison mode may be used for various purposes such as aesthetic purposes (e.g., checking makeup), self-diagnostic purposes (e.g., checking the face or the skin for problems or changes such as puffiness or sunburn and monitoring the results of teeth whitening), or recreational purposes (e.g., comparing an image of the face of the user with an image of the face of a celebrity).

Figure 5:
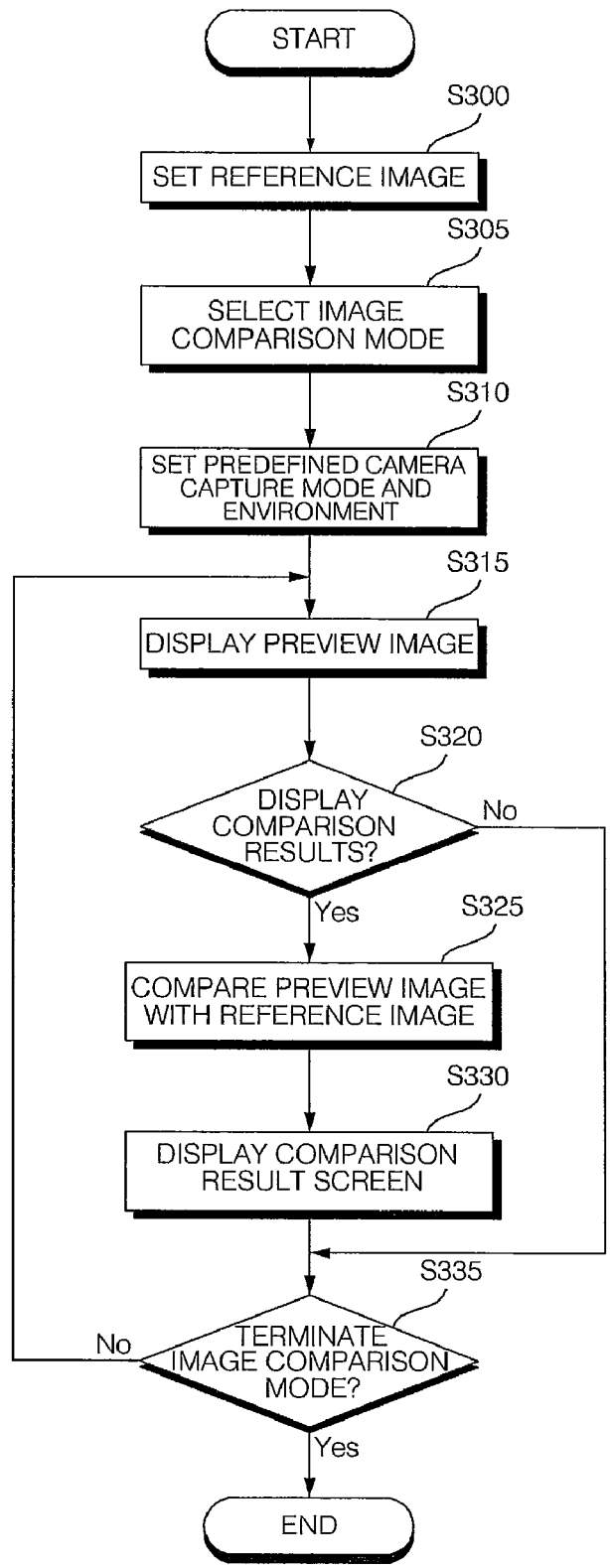
FIG. 5 illustrates a flowchart of a method of controlling the operation of a mobile terminal according to another exemplary embodiment of the present invention.

FIG. 5 illustrates a flowchart of a method of controlling the operation of a mobile terminal according to another exemplary embodiment of the present invention. Referring to FIG. 5, operations S300 through S315 are the same as their respective counterparts of FIG. 4, and thus, detailed descriptions thereof will be omitted.

Referring to FIG. 5, if the user chooses to view the differences between a reference image and a preview image (S320), the controller 180 may compare the reference image and the preview image (S325), and may display a comparison result screen showing the results of the comparison on the display module 151 (S330).

The user may half-press a shutter button or generate another user input and may thus allow the controller 180 to compare the reference image and the preview image. In order to facilitate the comparison of the reference image and the preview image, the preview image may be laid over the reference image, or lines representing the outlines of each object in the reference image may be displayed over the preview image. The comparison result screen may show both the preview image and the reference image and may mark parts of the preview image and the reference image that differ from each other distinctively. Alternatively, the parts of the preview image and the reference image that differ from each other may be enlarged and may thus be displayed on the whole comparison result screen.

In this manner, the user may be allowed to easily identify the differences between the reference image and the preview image from the comparison result screen.

FIGS. 6 through 9 illustrate diagrams for explaining the exemplary embodiment of FIG. 4.

Figure 6:
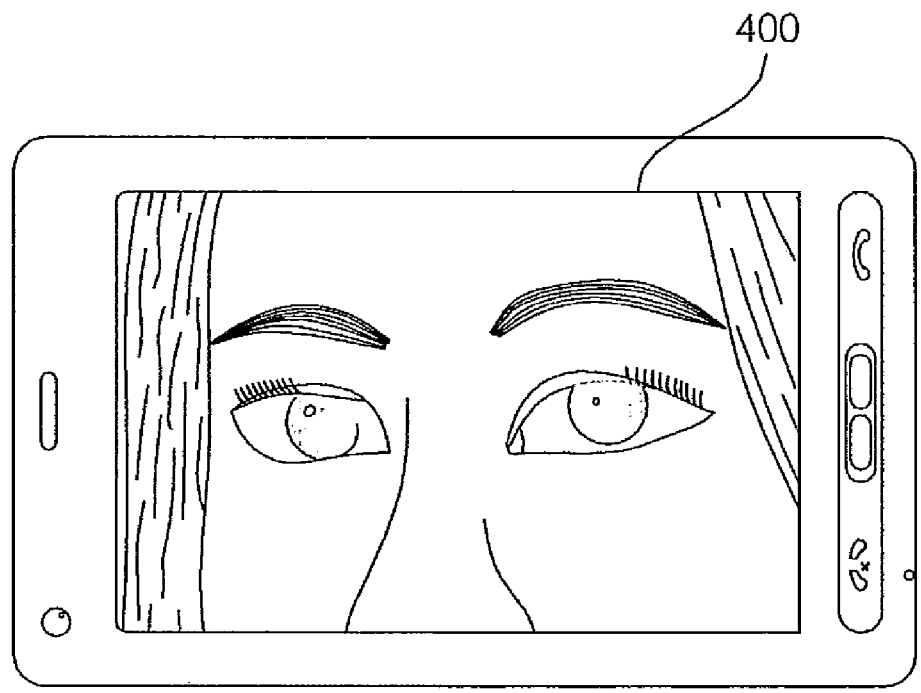
FIGS. 6 through 9 illustrate diagrams for explaining the exemplary embodiment of FIG. 4.

FIG. 6 illustrates a screen showing a reference image. Referring to FIG. 6, the reference image may be an image selected from a number of images captured by the camera module 121. For example, the user may set a close-up image of her eyes captured when she thought her eye makeup was well done as the reference image. Alternatively, the user may choose any other image as the reference image.

Figure 7:
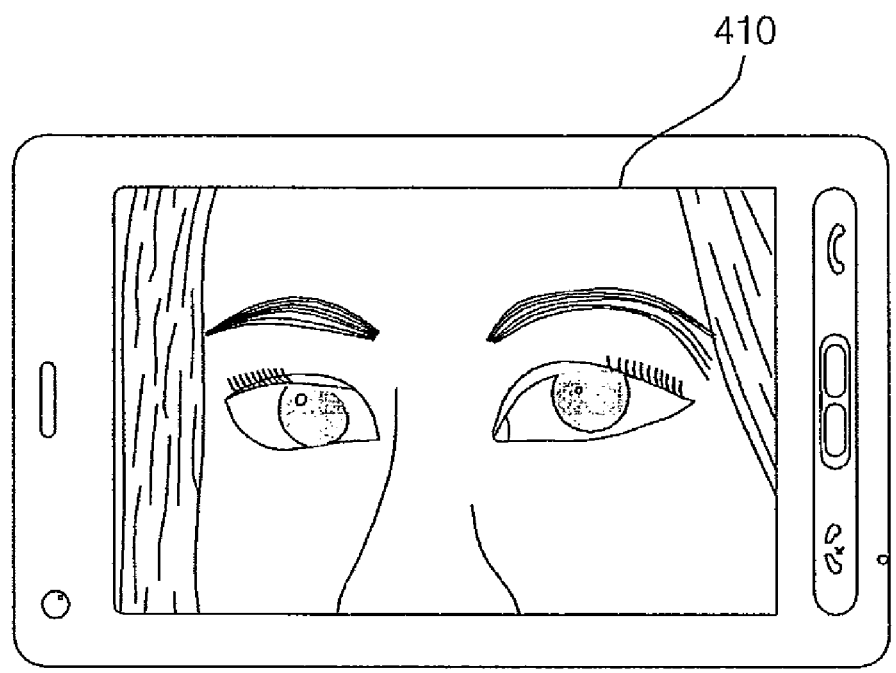

FIG. 7 illustrates a screen 410 showing a comparison image. Referring to FIG. 7, the comparison image may be an image captured by the camera module 121 for comparison with a reference image. In order to facilitate the comparison of the comparison image and the reference image, lines representing the outlines of the eyes and the nose in the reference image 400 may be displayed over the comparison image 410.

Figure 8:
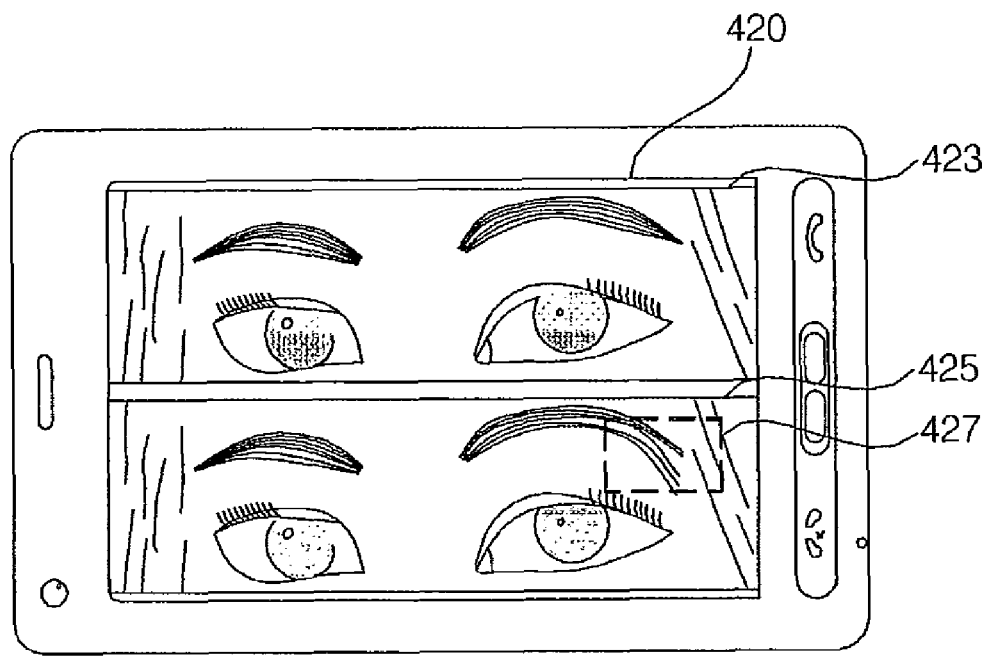

FIG. 8 illustrates an example of a comparison result screen showing the results of comparison of a reference image 423 and a comparison image 425, i.e., a comparison result screen 420. Referring to FIG. 8, the comparison result screen 420 may be divided into two screens, and a reference image 423 and a comparison image 425 may be displayed on the two screens. A part of the reference image 423 that differ from a corresponding part of the comparison image 425 may be laid over the corresponding part of the comparison image 425, as indicated by reference numeral 427. Alternatively, the overlay of the reference image part and the comparison image part that differ from each other may be enlarged and then displayed on the whole comparison result screen 420.

Figure 9:
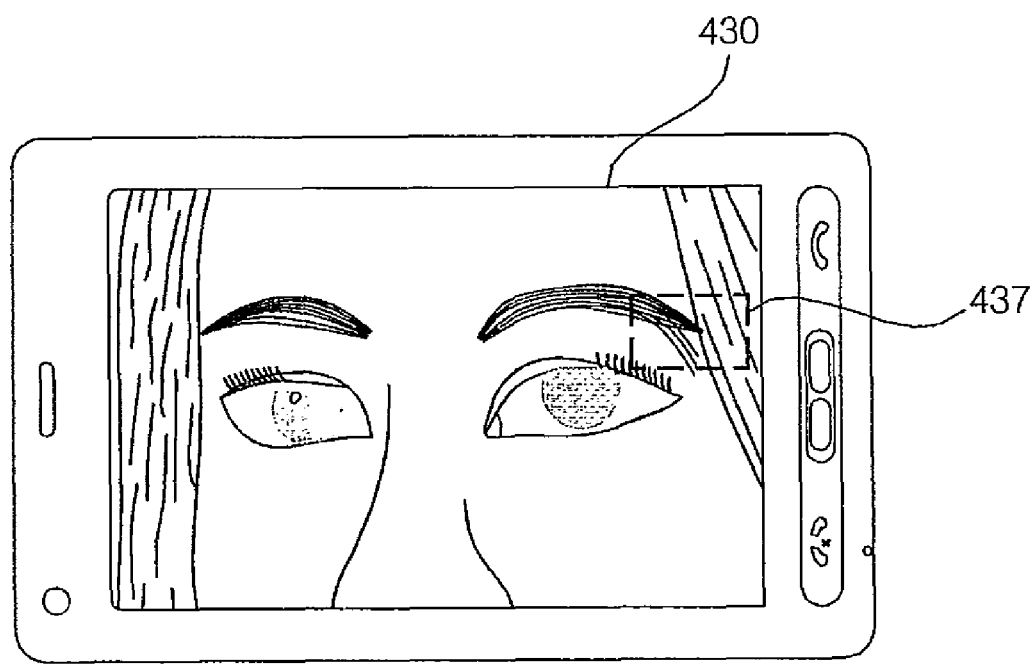

FIG. 9 illustrates another example of the comparison result screen showing the results of comparison of the reference image 423 and the comparison image 425, i.e., a comparison result screen 430. Referring to FIG. 9, the comparison result screen 430 may show an image obtained by laying the reference image 423 and the comparison image 425 over each other. Reference numeral 437 represents parts of the reference image 423 and the comparison image 425 that differ from each other.

FIGS. 10 through 13 illustrate diagrams for explaining the exemplary embodiment of FIG. 5.

Figure 10:
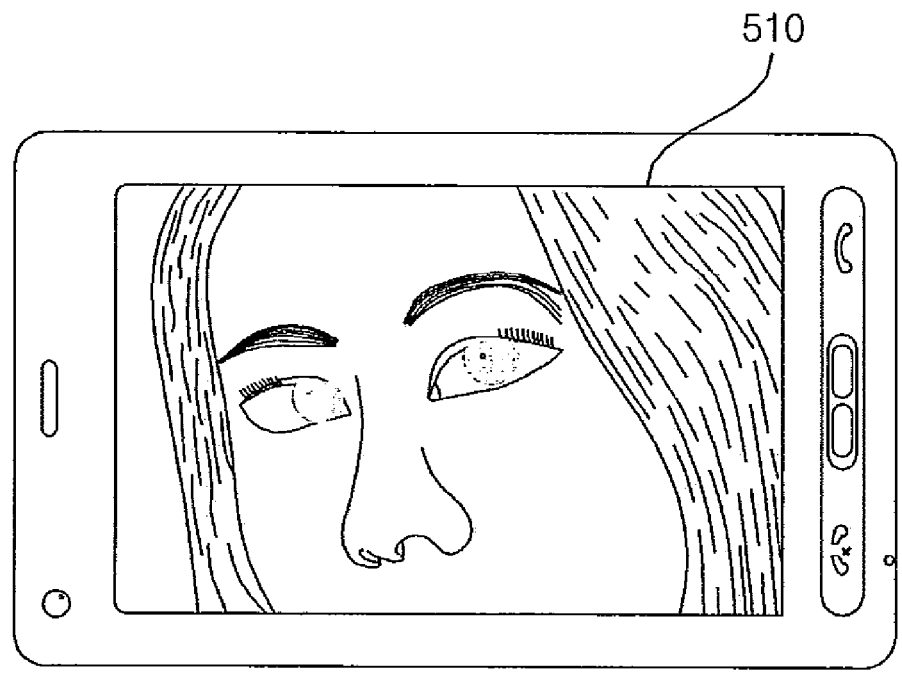
FIGS. 10 through 13 illustrate diagrams for explaining the exemplary embodiment of FIG. 5.
Figure 11:
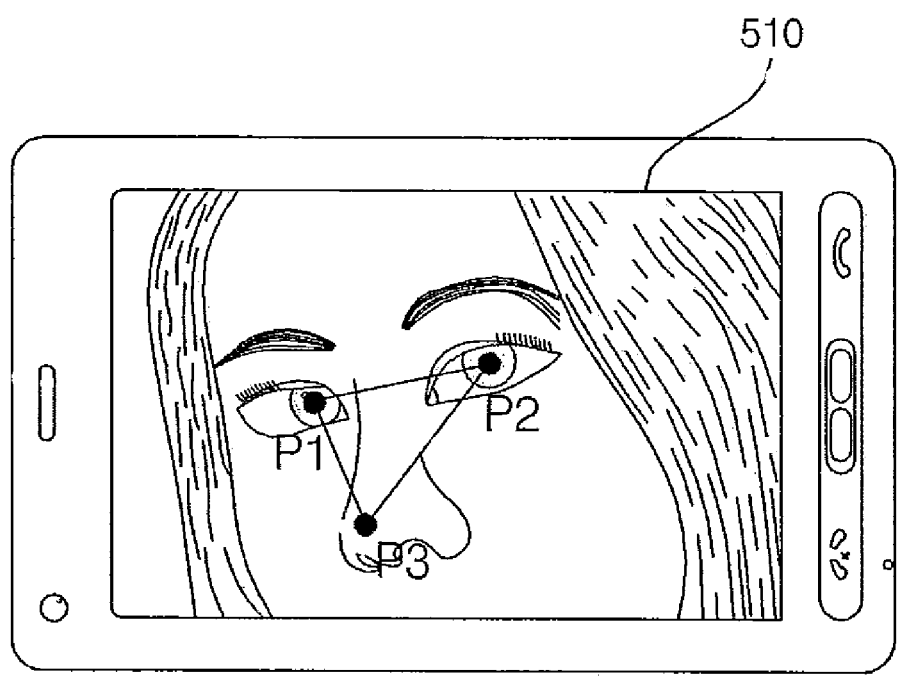

FIGS. 10 and 11 illustrate diagrams of a screen 510 showing a preview image. Referring to FIGS. 10 and 11, if the user chooses to display the results of comparison of a preview image 510 and a reference image when the screen 510 is displayed, parts of the preview image that differ from their respective parts of the reference image may be displayed. The preview image and the reference image may be compared with each other in consideration of positions P1 and P2 of the eyes in the preview image and a position P3 of the nose in the preview image.

Figure 12:
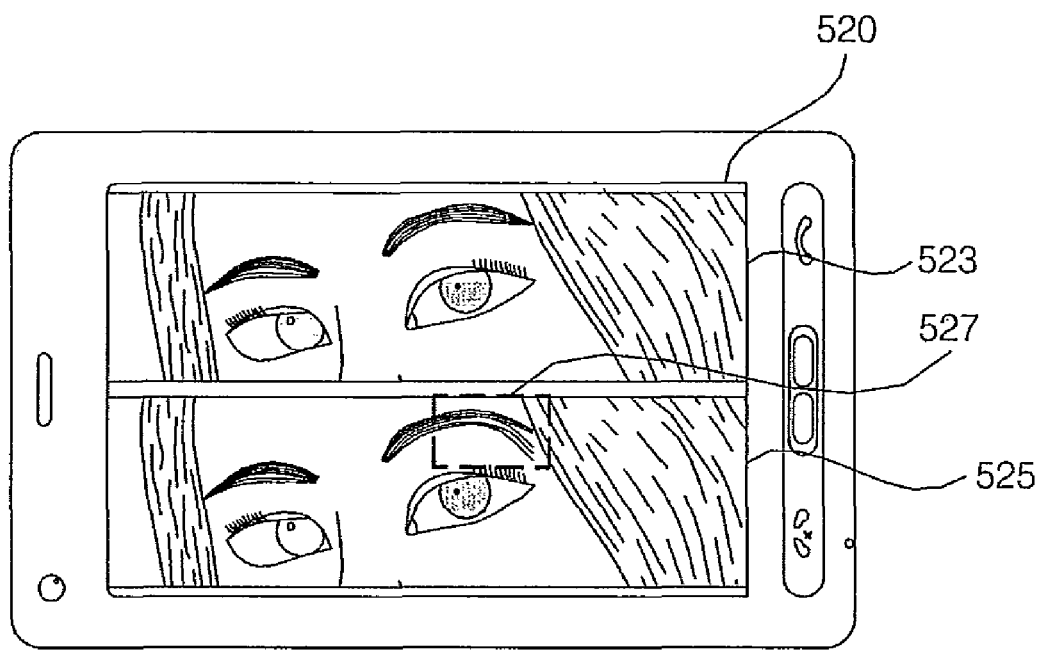

FIG. 12 illustrates an example of a comparison result screen showing the results of comparison of a reference image 523 and a preview image 525, i.e., a comparison result screen 520. Referring to FIG. 12, the comparison result screen 520 may be divided into two screens, and the reference image 523 and the comparison image 525 may be displayed on the two screens. A part of the reference image 523 that differ from a corresponding part of the comparison image 525 may be laid over the corresponding part of the comparison image 525, as indicated by reference numeral 527.

Figure 13:
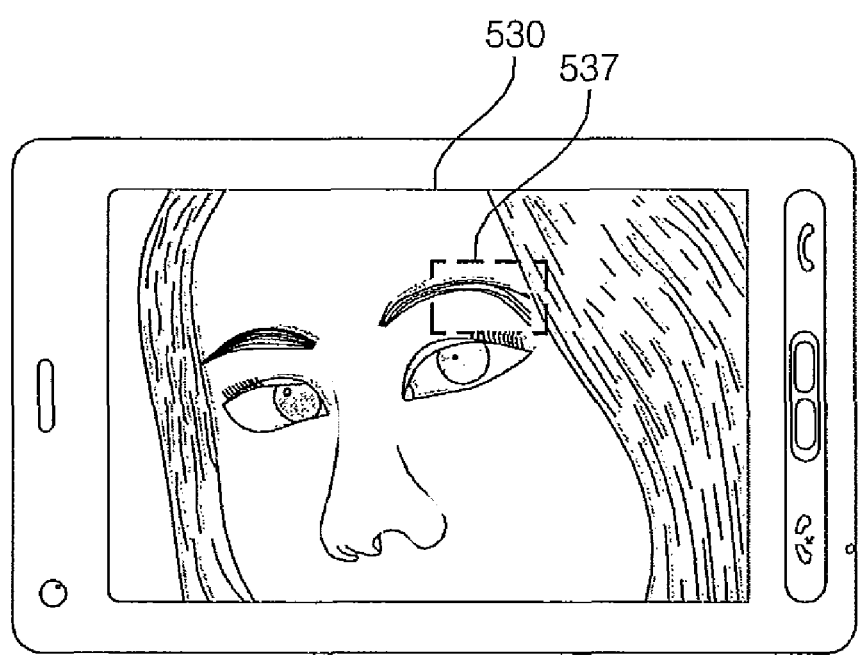

FIG. 13 illustrates another example of the comparison result screen showing the results of comparison of the reference image 523 and the preview image 525, i.e., a comparison result screen 530. Referring to FIG. 13, the comparison result screen 530 may show an image obtained by laying the reference image 523 and the comparison image 525 over each other. Reference numeral 537 represents parts of the reference image 423 and the comparison image 525 that differ from each other.

The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to compare an image captured by a camera with a reference image and display a comparison result screen showing the differences between the captured image and the reference image. In addition, it is possible to compare a preview image provided by a camera with a reference image and display a comparison result screen showing the differences between the preview image and the reference image. Therefore, it is possible for a user to easily identify changes in his or her own appearance or the condition of his or her own health from a comparison result screen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an operation of a mobile terminal, the method comprising:
    setting a first image as a reference image; and if an image comparison mode is selected, operating a camera in a close-up photography mode;
    displaying a preview image currently being provided by the camera on a display module;
    if the preview image is chosen to be captured, setting the preview image as a second image;
    displaying a comparison result screen showing differences between both respective corresponding parts of the first image and the second image,
    wherein the displaying of the comparison result screen comprises dividing the comparison result screen into two screens, displaying the first and second images on the two screens, and marking parts of the second image that differ from their respective corresponding parts of the first image distinctively; and
    displaying enlarged marked parts of the second image that differ from their respective corresponding parts of the first image on the display module.

2. The method of claim 1, wherein the displaying of the comparison result screen comprises displaying an image obtained by laying the first and second images over each other.

3. The method of claim 1, further comprising displaying lines representing differences between the preview image and the reference image on the preview image so as to facilitate the comparison of the first image and the second image.

4. The method of claim 1, further comprising entering the image comparison mode in response to a predetermined key or touch input for selecting the image comparison mode.

5. A mobile terminal comprising:
    a camera;
    a display module; and
    a controller configured to:
    set a first image as a reference image,
    if an image comparison mode is selected, operate the camera in a close-up photography mode,
    display a preview image provided by the camera on the display module,
    if the preview image is chosen to be captured, set the preview image as a second image,
    display a comparison result screen showing differences between both respective corresponding parts of the first image and the second image,
    divide the comparison result screen into two screens,
    display the first and second images on the two screens,
    mark parts of the second image that differ from their respective corresponding parts of the first image distinctively, and
    display enlarged parts of the second image that differ from their respective corresponding parts of the first image on the display module.

6. The mobile terminal of claim 5, further comprising a user input unit configured to receive a key signal for selecting the image comparison mode.

* * * * *